United States Patent
Palanivel et al.

(10) Patent No.: US 9,245,318 B2
(45) Date of Patent: Jan. 26, 2016

(54) METHODS AND SYSTEMS FOR AUTOMATED ORIENTATION DETECTION AND CORRECTION

(71) Applicants: Dhevendra Alagan Palanivel, Chennai (IN); Sainarayanan Gopalakrishnan, Chennai (IN); Xing Li, Webster, NY (US)

(72) Inventors: Dhevendra Alagan Palanivel, Chennai (IN); Sainarayanan Gopalakrishnan, Chennai (IN); Xing Li, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 9 days.

(21) Appl. No.: 14/272,741

(22) Filed: May 8, 2014

(65) Prior Publication Data

US 2015/0324954 A1  Nov. 12, 2015

(51) Int. Cl.
| | | |
|---|---|---|
| *H04N 1/024* | (2006.01) | |
| *G06T 3/60* | (2006.01) | |
| *G06T 3/40* | (2006.01) | |
| G06F 3/12 | (2006.01) | |
| G06K 15/00 | (2006.01) | |
| H04N 1/40 | (2006.01) | |

(52) U.S. Cl.
CPC .... *G06T 3/60* (2013.01); *G06T 3/40* (2013.01)

(58) Field of Classification Search
USPC ................ 358/474, 445, 1.14, 1.15
See application file for complete search history.

(56) References Cited

U.S. PATENT DOCUMENTS

| | | | |
|---|---|---|---|
| 2003/0020956 A1* | 1/2003 | Goel | G06K 15/02 358/1.18 |
| 2005/0140991 A1* | 6/2005 | Ogiwara | H04N 1/3875 358/1.2 |
| 2008/0297811 A1* | 12/2008 | Pierce | H04N 1/00408 358/1.6 |
| 2010/0134825 A1* | 6/2010 | Pierce | H04N 1/0035 358/1.15 |

OTHER PUBLICATIONS

"Automated Page Orientation and Skew Angle Detection for Binary Document Images;" Daniel X. Le, et al; http://archive.nlm.nih.gov/pubs/pubPDFs/prword.pdf.
"A Document Skew Detection Method Using Run-Length Encoding and the Hough Transform;" S.C. Hinds, et al; CH2898-5/90/0000/0464$01.O O *0* 1990 IEEE.

* cited by examiner

*Primary Examiner* — Barbara Reinier
*Assistant Examiner* — Henok A Shiferaw (57) ABSTRACT

Some embodiments are directed to a method of automatically modifying a scanned image of a page from an input document comprising a plurality of pages. First, scanned images of the plurality of pages are obtained. Next, a user selection for an output orientation of an output document and optionally value of N for an N-Up operation is received. Thereafter, input orientation of each scanned image is detected. Then, the scanned image is rotated, based on the detected input orientation, the output orientation and the value of 'N' if provided by the user. Next, the rotated scanned image content is resized so that it fits on a page. Finally, the output document is prepared that includes pages in the output orientation.

42 Claims, 8 Drawing Sheets

METHODS AND SYSTEMS FOR AUTOMATED ORIENTATION DETECTION AND CORRECTION

TECHNICAL FIELD

The disclosed embodiments relate to printing copies of scanned documents, and more specifically to automatically detect orientation and correct the same by rotating and resizing the scanned documents.

BACKGROUND

Scanners and printers have become basic office equipment based on the increased use of computers in offices. The use of scanners and printers at other locations, such as in homes, has also increased. Based on their increased usage, it has become advantageous to combine the features of scanners and printers into a single device.

A related art Multifunction Device (MFD) may act as a combination of some or all of the following devices: E-mail, Fax, Photocopier, Printer and Scanner. These devices can automatically scan multiple pages disposed in the device tray.

SUMMARY

However, related art MFD's are not capable of copying or scanning multiple pages with different orientations, into a document with the same orientation, e.g., all portrait, all landscape, etc. This issue is compounded with double-sided copies, i.e., double-sided copies of pages in different orientations result in unorganized images in different orientations on both sides of a page. It may therefore be beneficial to enable the copying and scanning of multiple pages with different orientations into a document with all pages in the same orientation, e.g., all portrait, all landscape, etc., based on the user's preferences.

Some related art MFDs have an environmental friendly feature known as the N-Up selection for copy/print jobs. Users may use this option to instruct the printer to copy/print multiple pages, such as 2/4/6 or more pages, on a single sheet based on a user selection. For N-Up copy/print, it is difficult for the user to predict a proper location to adhere staples because the output orientation of the aggregate output image is different from the original orientation of the individual images. Therefore, the user needs to choose the original image orientation and the number of staples in a user interface. The paper output orientation is determined based on the information concerning the page orientation, the number of staples, 'N' value and the selection of short edge feed (SEF) or long edge feed (LEF).

However, if an erroneous selection is made for any of the above issues, then the staple is adhered in the wrong location. Also, when the input pages are disposed in multiple orientations (i.e., some pages in portrait and some in landscape), then the resultant copied/printed pages include images in different orientations. Therefore, it may be beneficial to provide an option for N-Up copy/print with automated orientation detection and correction.

One aspect of the present disclosure provides a method of automatically modifying a scanned image of a page from an input document. The input document includes a plurality of pages. First, the method includes obtaining scanned images of the plurality of pages. Next, a user selection for an output orientation of an output document is received. Thereafter, the method includes detecting input orientation of each scanned image. Then, the method includes rotating the scanned image, based on the detected input orientation and the output orientation, and resizing the rotated scanned image content so that it fits on a page in the output orientation. Finally, the method includes preparing the output document such that the plurality of pages is provided in the output orientation.

Another aspect of the present disclosure provides a system configured to automatically modify a scanned image of a page from an input document. The input document includes a plurality of pages. First, the system obtains scanned images of the plurality of pages. Next, the system receives a user selection for an output orientation of an output document. Thereafter, the system detects input orientation of each scanned image. Then, the system rotates the scanned image, based on the detected input orientation and the output orientation, and resizes the rotated scanned image content so that it fits on a page in the output orientation. Finally, the system prepares the output document such that the plurality of pages is provided in the output orientation.

Another aspect of the present disclosure provides a system configured to automatically modify a scanned image of a page from an input document. The input document includes a plurality of pages. The system includes a scanning module configured to obtain scanned images of the plurality of pages. The system further includes a user selecting module configured to receive a user selection for an output orientation of an output document. Yet further, the system includes a detecting module configured to detect input orientation of each scanned image. The system also includes an orienting module configured to rotate the scanned image, based on the detected input orientation and the output orientation, and resize the rotated scanned image content so that it fits on a page in the output orientation. Finally, the system includes a preparing module configured to prepare the output document such that the plurality of pages is provided in the output orientation.

Another aspect of the present disclosure provides a system that includes a printer driver configured to automatically modify a scanned image of a page from an input document. The input document includes a plurality of pages. First, the printer driver obtains scanned images of the plurality of pages. Next, it receives a user selection for an output orientation of an output document. Thereafter, the printer driver detects input orientation of each scanned image. Then, the printer driver rotates the scanned image, based on the detected input orientation and the output orientation, and resizes the rotated scanned image content such that it fits on a page in the output orientation. Finally, the printer driver prepares the output document such that the plurality of pages is provided in the output orientation.

Another aspect of the present disclosure provides a method of automatically modifying a scanned image of a page from an input document. The input document includes a plurality of pages. The method includes obtaining scanned images of the plurality of pages. Then, the method includes receiving a user selection for an output orientation of an output document. Next, the method includes detecting input orientation of each scanned image. Thereafter, the method includes rotating the scanned image (when the input orientation of a scanned image does not match the output orientation), and resizing the rotated scanned image content such that it fits on a page in the output orientation. Finally, the method includes preparing the output document such that the plurality of pages is provided in the output orientation.

Another aspect of the present disclosure provides a method of automatically modifying a scanned image of a page from an input document. The input document includes a plurality of pages. The method includes obtaining scanned images of the plurality of pages. Then, the method includes receiving a user selection for an output orientation of an output document and for printing N pages of the input document on a single page in the output document. Next, the method includes detecting input orientation of each scanned image. Thereafter, the method includes rotating the scanned image, when at least one of following conditions is met: the output orientation is landscape, the input orientation of the scanned image is portrait and N is a square number; the output orientation is portrait, the input orientation of the scanned image is landscape and N is a square number; the output orientation is landscape, the input orientation of the scanned image is landscape and N is not a square number; and the output orientation is portrait, the input orientation of the scanned image is portrait and N is not a square number. Then, the method includes resizing the rotated scanned image content such that it fits on a page in the output orientation. Finally, the method includes preparing the output document, which includes further resizing the plurality of pages such that N pages are printed in the output orientation on a single page in the output document.

The orientation detection of the various embodiments can be performed based on any acceptable process. For example, in accordance with some embodiments, the orientation detection is performed using projection profiles, which includes mapping a binary image into a one-dimensional array, i.e., histogram.

The necessary correction is then applied based on the user's selection of either portrait or landscape output orientation. In the context of N-up jobs, for a particular input image orientation, the output image orientation can be either portrait or landscape, depending on the N-selection. In order to achieve uniform output orientation for N-up jobs, the correction decision is taken based on both user N selection and the input orientation. Thus, in accordance with some of the disclosed embodiments, correction involves adaptive scaling based on the content width.

DETAILED DESCRIPTION

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

DEFINITIONS

Definitions of one or more terms used in this disclosure are provided below.

A Multi-Function Product/Printer/Peripheral (MFP), a multifunctional all-in-one (AIO) or a Multifunction Device (MFD) is an electronic device that acts as a combination of some or all of the following devices: E-mail, Fax, Photocopier, Printer and Scanner. A "scanner" is one of an optical scanner, a digital camera, a facsimile machine, a digital photocopier, a Multi-Function Product/Printer/Peripheral (MFP), a multi-functional all-in-one (AlO), a Multi-function Device (MFD) or any other digital imaging device.

As used herein, a "physical document" is a document printed on a physical media such as a paper. Further, "soft document" is an electronic document available in any suitable format such as MS WORD and PDF.

As used herein, a "page orientation" is the way in which a rectangular page is oriented for normal viewing. The two most common types of orientation are "portrait" and "landscape". "Portrait orientation" of a page is where the page has more height than width. "Landscape orientation" of a page is where the width of the page is greater than the height. "N-Up" is an environmental friendly feature available in MFD/MFP/MIO that can help save toner and paper and with that save resources. The N-Up selection for copy/print jobs allows an MFD/MFP/MIO to copy/print 2/4/6 or more pages on a sheet based on a user selection. "N-Up" is often used for draft documents and archiving.

As used herein, an "orientation correction" of a page involves performing one or more of rotating the page and resizing the page.

Overview

Currently, devices are available that allow users to input document including multiple pages, which are then automatically scanned and printed. However, these devices do not have the capability to provide an output document in which all pages are in the same orientation, e.g., all portrait or all landscape. This issue is compounded with double-sided copies, i.e., double-sided copies of pages in different orientations result in unorganized images in different orientations on both sides of a page. Therefore, it may be beneficial to enable the copying and scanning of multiple pages with different orientations into a document with all pages in the same orientation, e.g., all portrait, all landscape, etc., based on the user's preferences. Accordingly, some embodiments of present disclosure are directed to automatically modifying a scanned image of a page from an input document including a plurality of pages, which may be in mixed orientations. First, scanned images of the plurality of pages are obtained and input orientation of each scanned image is automatically detected. Further, a user selects an output orientation of an output document. For the pages, where the input orientation does not match the output orientation, the scanned image is rotated and the rotated page content is resized to fit on a page in the output orientation. Finally, the output document is prepared so that all pages are in the output orientation.

Therefore, the present disclosure provides a robust, full-automated technique to obtain the output document in one orientation irrespective of the orientation of pages in the input document. Further, some embodiments of the present disclosure provide a technique to process N-Up jobs where multiple pages of the input document are printed on a single page in the output document, wherein the pages in the output document are in same orientation. Therefore, the disclosure simplifies the N-Up jobs as it does not require the user to indicate the initial orientation of the scanned document pages, and thus eliminates some potential errors in the copy/print process (i.e., the user enters the wrong orientation, or the document contains pages of mixed orientation).

Environment Diagram

Figure 1:
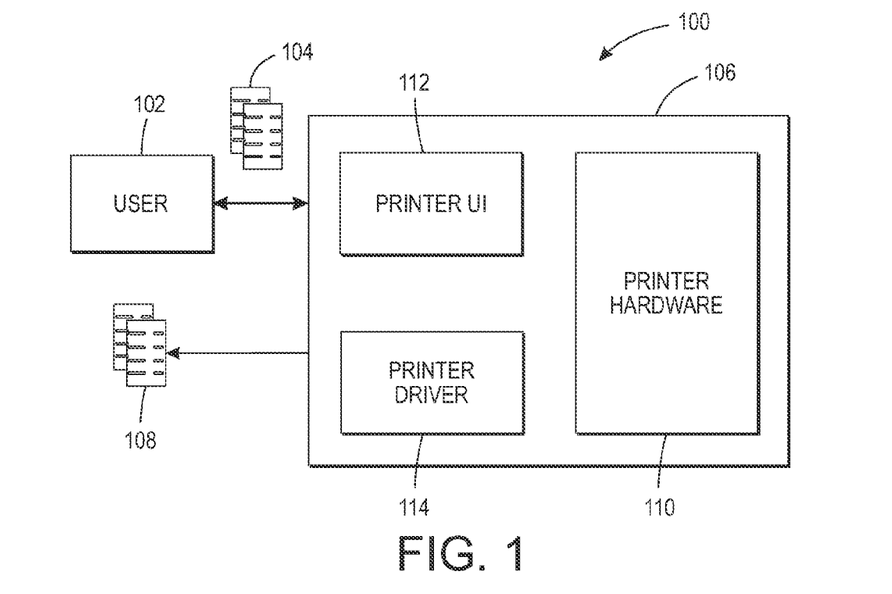
FIG. 1 is a block diagram illustrating an environment in which some embodiments of the present invention are implemented.

FIG. 1 is a block diagram illustrating an environment 100 in which some embodiments of the present invention are implemented. A user 102 provides an input document 104 (includes multiple pages) to an electronic device 106. The electronic device 106 is capable of receiving the input document 104 provided by the user 102 and then printing an output document 108, which may be a physical document or a soft document (e.g., a PDF document).

The electronic device 106 may be one of an optical scanner, a digital camera, a facsimile machine, a digital photocopier, a Multi-Function Product/Printer/Peripheral (MFP), a multifunctional all-in-one (AlO), a Multi-function Device (MFD) or any other digital imaging device.

Further, the electronic device 106 includes a printer hardware 110 that accepts the input document 104, processes the input document 104 as per user instructions and outputs the output document 108. Further, the electronic device 106 includes a printer user interface (UI) 112 that allows the user 102 to give instructions to the electronic device 106. The electronic device 106 also includes a printer driver 114 that operates and controls the printer hardware 108 and the printer UI 112. The printer driver 114 is stored in a read-only memory (ROM).

Overall Exemplary System

Figure 2:
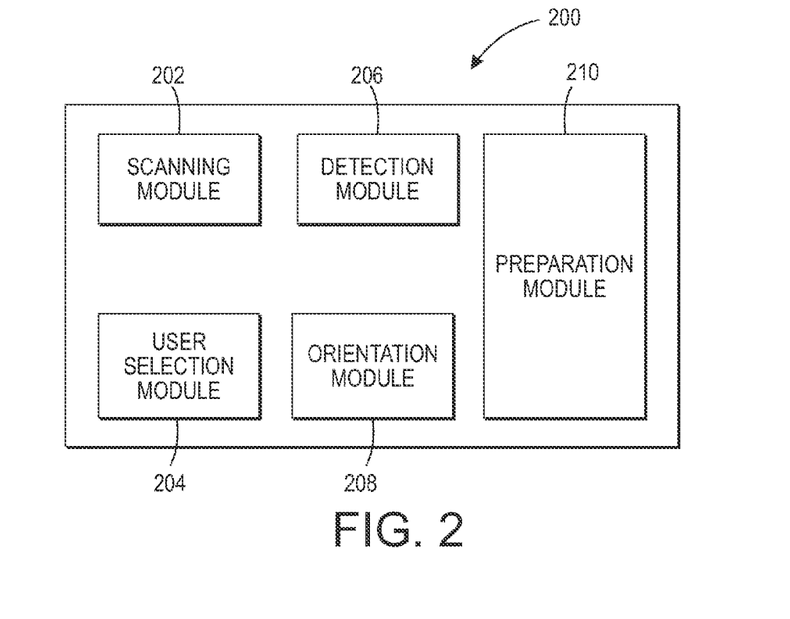
FIG. 2 illustrates an overall exemplary system according to one aspect of the present disclosure.

FIG. 2 illustrates an overall exemplary system 200 according to one aspect of the present disclosure. The various modules illustrated in the system 200 may be implemented using one or more of the printer hardware 108, the printer UI 112 and the printer driver 114. Further, in an alternate embodiment where the user 102 inputs soft documents and requires a soft document as the output document, the modules of the system 200 may be implemented as software installed on a user computer.

The system 200 includes a scanning module 202 that obtains scanned images of the input pages 104. The scanning module 202 is configured to obtain the scanned images by performing at least one of receiving the scanned images of the plurality of pages from a scanner, receiving the scanned images of the plurality of pages stored in a memory and creating the scanned images from one or more electronic documents provided by a user. If the user 102 provides physical pages as the input pages 104, then the scanning module 202 scans the input pages 104 to obtain scanned images required for further processing. However, if the user 102 provides soft documents as the input pages 104, then the scanning module 202 parses the input pages 104 to obtain scanned images for required further processing. Further, the system 200 includes a user selection module 204 configured to receive a user selection for an output orientation of an output document. The user selection module 204 may provide the printer UI 112 to receive a user selection. The user 102 may also select if the output document is a physical document or a soft document. Further, the user 102 may also select number of pages of input document 104 to be printed on a single page in the output document 108 for an N-Up job. The N-Up jobs are explained in further detail in conjunction with FIGS. 5-11 below.

Further, the system 200 includes a detection module 206 configured to automatically detect input orientation of each scanned image obtained by the scanning module 202. The detection module 206 detects the input orientation using one of any known, related art or later developed techniques. For example, one approach involves using projection profiles to determine the input orientation. This approach is based on a local analysis of projection profiles, vertical and horizontal variances on a page. The technique is used to reduce the impact of non-textual data, such as blanks, graphics, forms, line art, large fonts, and dithered images from the page orientation result. Specifically, it involves segmenting a scanned image of a page into text and non-text regions, and analyzing the text regions to determine the input orientation using projection profiles. Projection is an operation that maps a binary image into a one-dimensional array called histogram or projection profile. The text region is separated into several blocks. Each block is then analyzed for page orientation using horizontal and vertical projection profiles. For portrait orientation, the number of short runs in the horizontal projection will be larger than that in the vertical projection. Then, based on results for majority of text blocks, the input orientation is determined.

The system 200 further includes an orientation module 208 configured to rotate and resize the scanned image of a page of the input document 104 based on user instructions. This has been explained in further detail in conjunction with FIGS. 3 and 5 below.

Finally, the system 200 includes a preparation module 210 configured to prepare the output document 108 based on the user instructions. The plurality of pages of the output document 108 is provided in the output orientation. Further, the output document 108 may be obtained as a physical document printed on a paper sheets or as a soft document.

Overall Exemplary Method

Figure 3:
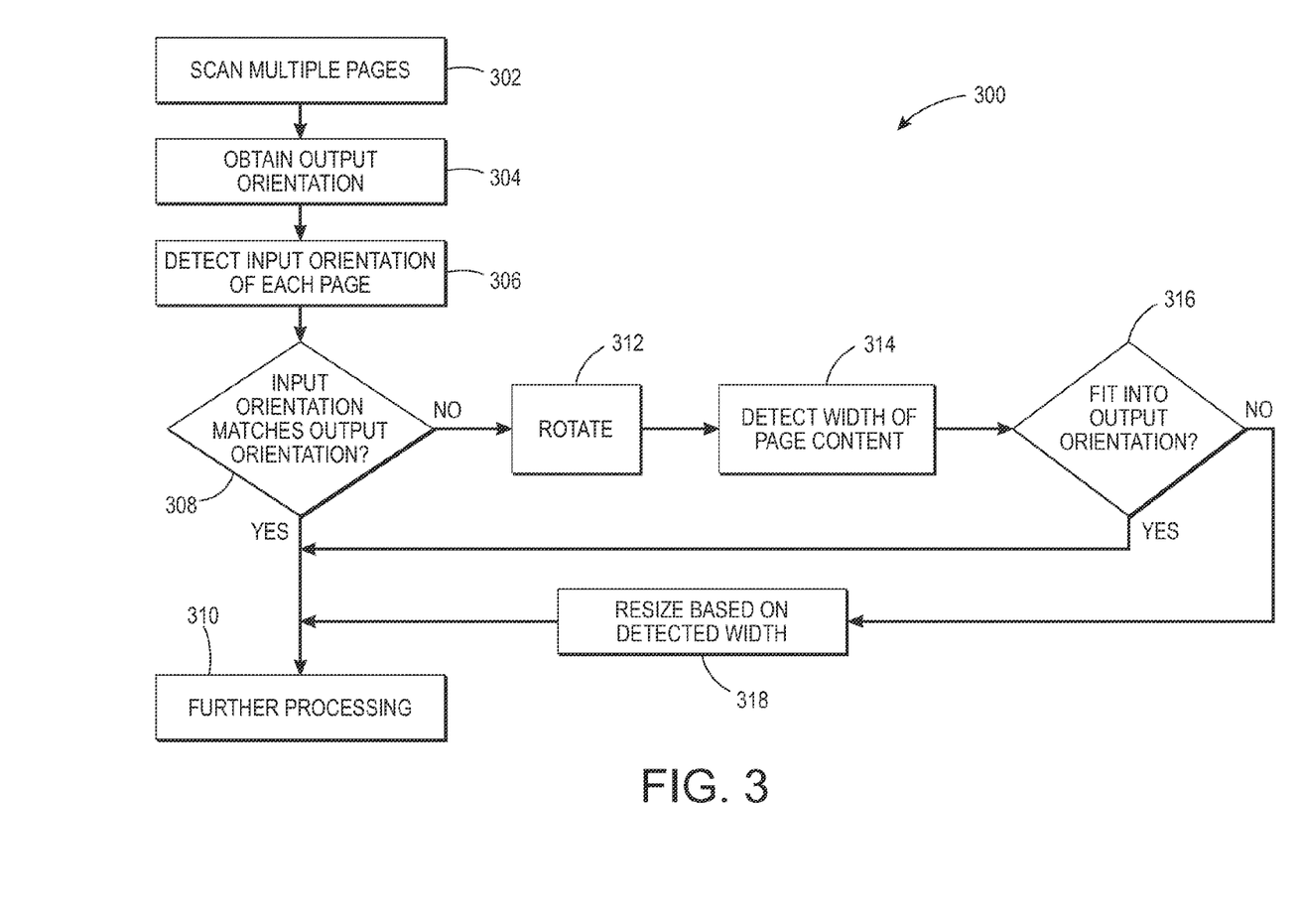
FIG. 3 is a flowchart illustrating a method for scanning multiple pages of different orientations and printing the same so that the output orientation of all pages in the printed document is the same, e.g., all portrait or all landscape orientation, based on user preferences, according to one aspect of the present disclosure.

FIG. 3 is a flowchart illustrating a method 300 of scanning multiple pages of different orientations, and printing the same so that the output orientations of all of the pages in the printed document are same, e.g., all portrait or all landscape orientation, based on a user's preferences, according to one aspect of the present disclosure. At step 302, the scanning module 202 scans multiple pages of the input document 104. Next at step 304, the user 102 uses the user selection module 204 to select one of the portrait orientation and the landscape orientation as the output orientation.

Thereafter, at step 306, the detection module 206 detects input orientation of each scanned page. Next at step 308, the orientation module 208 checks whether the determined input orientation of each scanned page matches the output orientation. If the orientation module 208 determines that the determined input orientation matches the output orientation, then the orientation module 208 does not process the page further and sends the page to the preparation module 210 (step 310) for further processing. However, if the orientation module 208 determines that the input orientation of the scanned page does not match the output orientation, then the orientation module 208 rotates the scanned image of the page at step 312. The orientation module 208 may rotate the scanned image of page by 90 degrees or 270 degrees. Thereafter, at step 314, the orientation module 208 detects the width of the page content after rotation. Next at step 316, the orientation module 208 checks to determine whether page content after rotation fits on the output orientation of the page, based on the detected width of the page content. For example, the size of an A4 page is 8.27 inches×11.69 inches. If a 1 inch margin is left on all sides, then the printable size becomes 6.27 inches×9.69 inches, which implies that the width is 6.27 inches for portrait output orientation and 9.69 inches for landscape output orientation. If at step 316, the orientation module 208 determines that the page content fits on the output orientation of the page, then the orientation module 208 sends the rotated page to the preparation module 210 (step 310) for further processing. However, if the orientation module 208 determines that the page content does not fit on the output orientation of the page; then the orientation module 208 adaptively resizes or downscales the page content based on detected page width until the page content fits the output orientation of the page. Alternatively, the orientation module 208 downscales the page content based on a fixed ratio downscaling to fit the output orientation. The resized page is then sent to the preparation module 210 (step 310) for further processing. Finally, at step 310, the preparation module 210 arranges the multiples pages in order to prepare the output document 108. All pages in the output document 108 are in the output orientation. Further, if the output document 108 is a physical document, the preparation module 210 may also perform at least one of stapling, hole punching, folding, annotating and including one or more of page numbers, dates and watermarks. However, if the output document 108 is a soft document, then the preparation module 210 prepares the output document 108 in an appropriate format, e.g., PDF document, MS Word document, etc.

Figure 4:
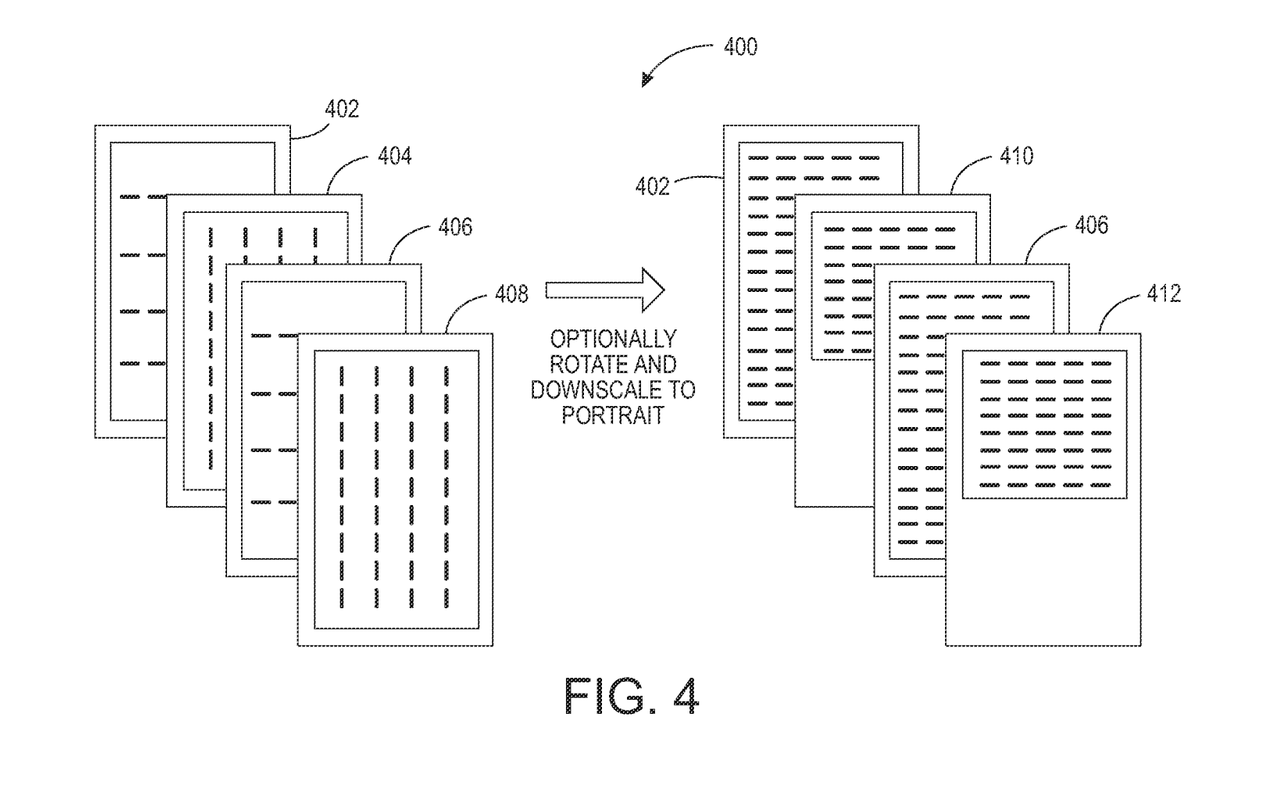
FIG. 4 is a schematic illustrating an operation of a method, according to an exemplary embodiment of present disclosure.

FIG. 4 is a schematic 400 illustrating an exemplary embodiment of present disclosure. The scanning module 202 scans an input document containing four pages provided by the user 102 to obtain four scanned images 402-408. Then the user 102 uses the user selection module 204 to select portrait as the output orientation. Next at step 106, the detection module 206 detects the input orientation of each of the four scanned images 402-408. The detection module 206 detects that the scanned images 402 and 406 have portrait input orientation, and the scanned images 404 and 408 have landscape input orientation. Thereafter, the orientation module 208 checks to determine whether orientation of each scanned image matches the output orientation. Accordingly, the orientation module 208 sends the pages 402 and 406 to the preparation module 210 for further processing. Further, the orientation module 208 rotates the images of pages 404 and 408 to obtain rotated images of the pages 404 and 408. Then, the orientation module 208 detects the width of page content on rotated images of the pages 404 and 408. Next, the orientation module 208 determines whether the page content on each page 404 and 408 fits on the width of the output orientation. If the page content fits, then the rotated page is sent to the preparation module 210 for further processing. However, if the page content does not fit, then the orientation module 208 adaptively resizes or downscales the page content based on detected page width such that it fits the width of the output orientation. The orientation module 208 sends the resized page to the preparation module 210 for further processing. Finally, the preparation module 210 receives the original images of pages 402 and 406 and rotated images (and optionally downscaled) 410 and 412 of the pages 404 and 408. Then, the preparation module 210 prepares an output document with all pages in portrait orientation as per instructions provided by the user 102.

Overall Exemplary Method for N-Up Jobs

Figure 5:
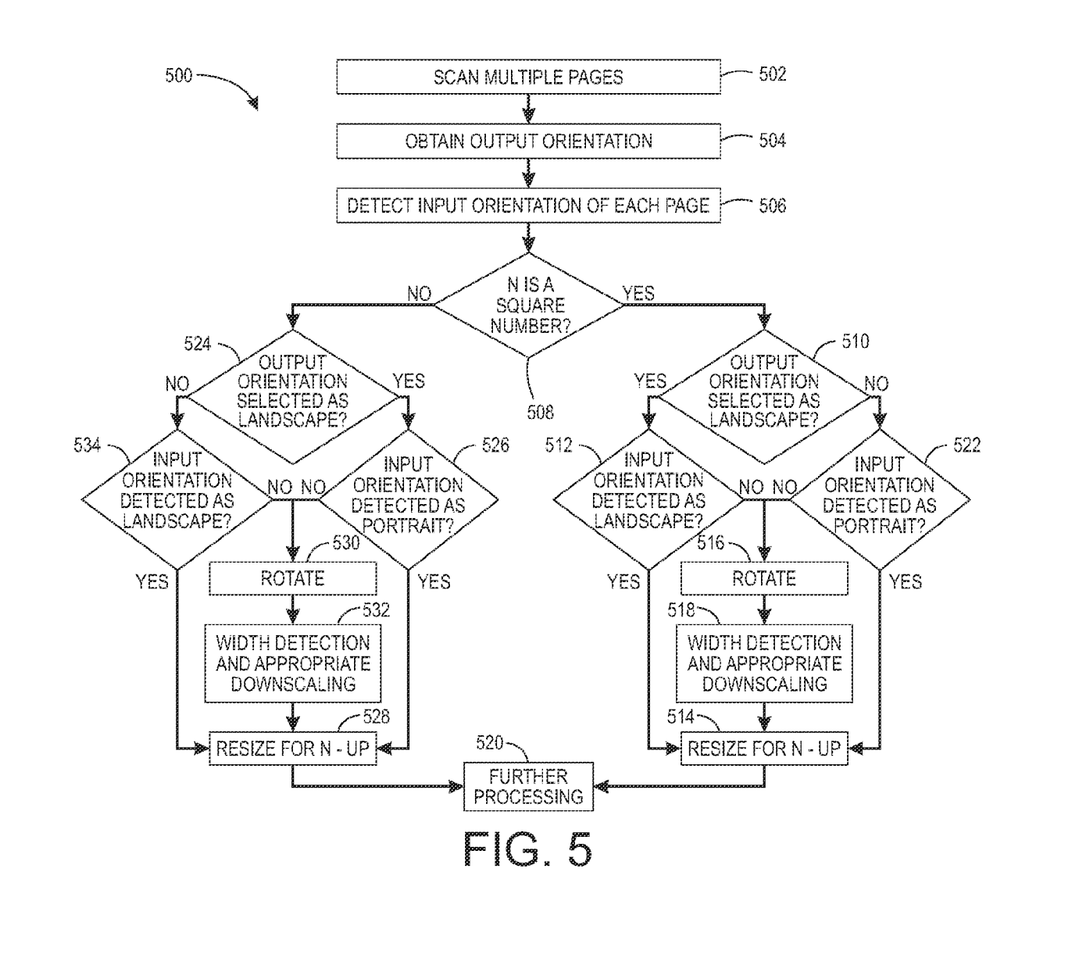
FIG. 5 is a flowchart illustrating a method for performing N-Up copy and print jobs with automated orientation detection and correction, according to one aspect of the present disclosure.

FIG. 5 is a flowchart illustrating a method 500 for performing N-Up copy and print jobs with automated orientation detection and correction, according to one aspect of the present disclosure. At step 502, the scanning module 202 scans the input document 104. Next at step 504, the user 102 uses the user selection module 204 to select one of the portrait orientation and the landscape orientation as an output orientation. Further, the user 102 selects a number 'N' for an N-Up operation, where N>1. If the user 102 selects the value of N as 1, then the system 200 employs the method 300 disclosed above. Also, if the user 102 does not select any value of 'N', in that case the default value of 'N' is used for processing the input document. If the value of N>1, then the system 200 proceeds with the method 500. Accordingly, at step 506, the detection module 206 detects input orientation of each scanned page. The detection module 206 detects the input orientation using one of the many existing techniques as explained in further detail in conjunction with FIG. 2 above.

Next at step 508, the orientation module 208 checks to determine whether N is a square number. If at step 508, the orientation module 208 determines that N is a square number, then the method 500 goes to step 510, where each page of the input document 104 is processed one-by-one. Next at step 510, the orientation module 208 checks to determine whether the output orientation is landscape. If at step 510, the orientation module 208 determines the output orientation as landscape, then the method 500 goes to step 512. At the step 512, the orientation module 208 checks to determine whether the input orientation of a page is landscape. If the orientation module 208 determines that the input orientation of the page is landscape, then the method 500 goes to step 514 for resizing image of the page for adjustment as per the N-Up selection of the user. Then, the preparation module 210 resizes the image for N-Up using any known, related art or later developed techniques. The resizing of the image for a 4-Up selection is explained in further detail in conjunction with FIGS. 6 and 7 below. Further, the resizing of image for a 4-Up selection is explained in further detail in conjunction with FIGS. 8 and 9 below.

However, if at step 512, the orientation module 208 determines that the input orientation of the page is portrait, and then the method 500 goes to a step 516 to rotate the scanned image of the page into landscape orientation. Thereafter, the method 500 proceeds to step 518, where the orientation module 208 detects the width of the page content after rotation. If the page content does not fit on the landscape orientation of the page, then the orientation module 208 downscales the page content based on detected page width such that it fits the width of page in landscape format. Alternatively, the orientation module 208 downscales the page content based on a fixed ratio downscaling to fit landscape orientation. Thereafter, the method 500 proceeds to step 514, where the preparation module 210 resizes image of the page for adjustment as per the N-Up selection of the user. Finally, the method 500 proceeds to step 520 for further processing. However, if at step 510, the orientation module 208 determines the output orientation as portrait, then the method 500 goes to step 522. At the step 522, the orientation module 208 checks to determine whether the input orientation of a page is portrait. If the orientation module 208 determines that the input orientation of the page is portrait, then the method 500 goes to step 514 for resizing image of the page for adjustment as per the N-Up selection of the user. However, if at step 522, the orientation module 208 determines that the input orientation of the page is landscape, and then the method 500 goes to a step 516 to rotate the scanned image of the page into portrait orientation. Thereafter, the method 500 proceeds to step 518, where the orientation module 208 detects the width of the page content after rotation. If the page content does not fit on the portrait orientation of the page, then the orientation module 208 downscales the page content based on detected page width such that it fits the width of page in portrait format. Alternatively, the orientation module 208 downscales the page content based on a fixed ratio downscaling to fit portrait orientation. Thereafter, the method 500 proceeds to step 514 for processing as described above.

Further, if at step 508, the orientation module 208 determines that N is not a square number, then the method 500 goes to step 524, where each page of the input document 104 is processed one-by-one. At step 524, the orientation module 208 checks to determine whether the output orientation of a page is landscape. If it is determined that the output orientation of the page is landscape, then the method 500 goes to step 526. At step 526, the orientation module 208 checks to determine whether the input orientation of a page is portrait. If it is determined that the input orientation of the page is portrait, then the method 500 proceeds to step 528, where the preparation module 210 resizes the image of the page for adjustment as per the N-Up selection of the user. However, if it is determined at step 526 that the input orientation of page is landscape, then the method 500 proceeds to step 530, where the orientation module 208 rotates the scanned image of the page into portrait orientation. Thereafter, the method 500 proceeds to step 532, where the orientation module 208 detects the width of the page content after rotation. If the page content does not fit on the portrait orientation of the page, then the orientation module 208 downscales the page content based on the detected page width so that it fits the width of page in portrait orientation. Alternatively, the orientation module 208 downscales the page content based on a fixed ratio downscaling to fit portrait orientation. Then, the method proceeds to step 528, where the preparation module 210 resizes image of the page for adjustment as per the N-Up selection of the user 102. However, at step 524, if it is determined that the output orientation of the page is portrait, then the method 500 goes to step 534. At step 534, the orientation module 208 checks to determine whether the input orientation of a page is landscape. If it is determined that the input orientation of the page is landscape, then the method 500 proceeds to step 528, where the preparation module 210 resizes the image of the page for adjustment as per the N-Up selection of the user. However, if it is determined at step 534 that the input orientation of page is portrait, then the method 500 proceeds to step 530 to rotate the scanned image of the page into landscape orientation. Thereafter, the method 500 proceeds to step 532, where the orientation module 208 detects the width of the page content after rotation. If the page content does not fit on the landscape orientation of the page, then the orientation module 208 downscales the page content based on the detected page width so that it fits the width of page in landscape orientation. Alternatively, the orientation module 208 downscales the page content based on a fixed ratio downscaling to fit landscape orientation. Then, the method proceeds to step 528 for processing as described above.

Finally, the method 500 proceeds from step 528 to step 520 for further processing, where the preparation module 210 orders all the pages and presents to the user 102 the output document 108 with all pages in the output orientation and N number of pages of the input document 104 printed on a single page of output document 108. Further, if the output document 108 is a physical document, the preparation module 210 may also perform at least one of stapling, hole punching, folding, annotating and including one or more of page numbers, dates and watermarks. However, if the output document 108 is a soft document, then the preparation module 210 prepares the output document 108 in an appropriate format, e.g., PDF document, MS Word document, etc.

Figure 6:
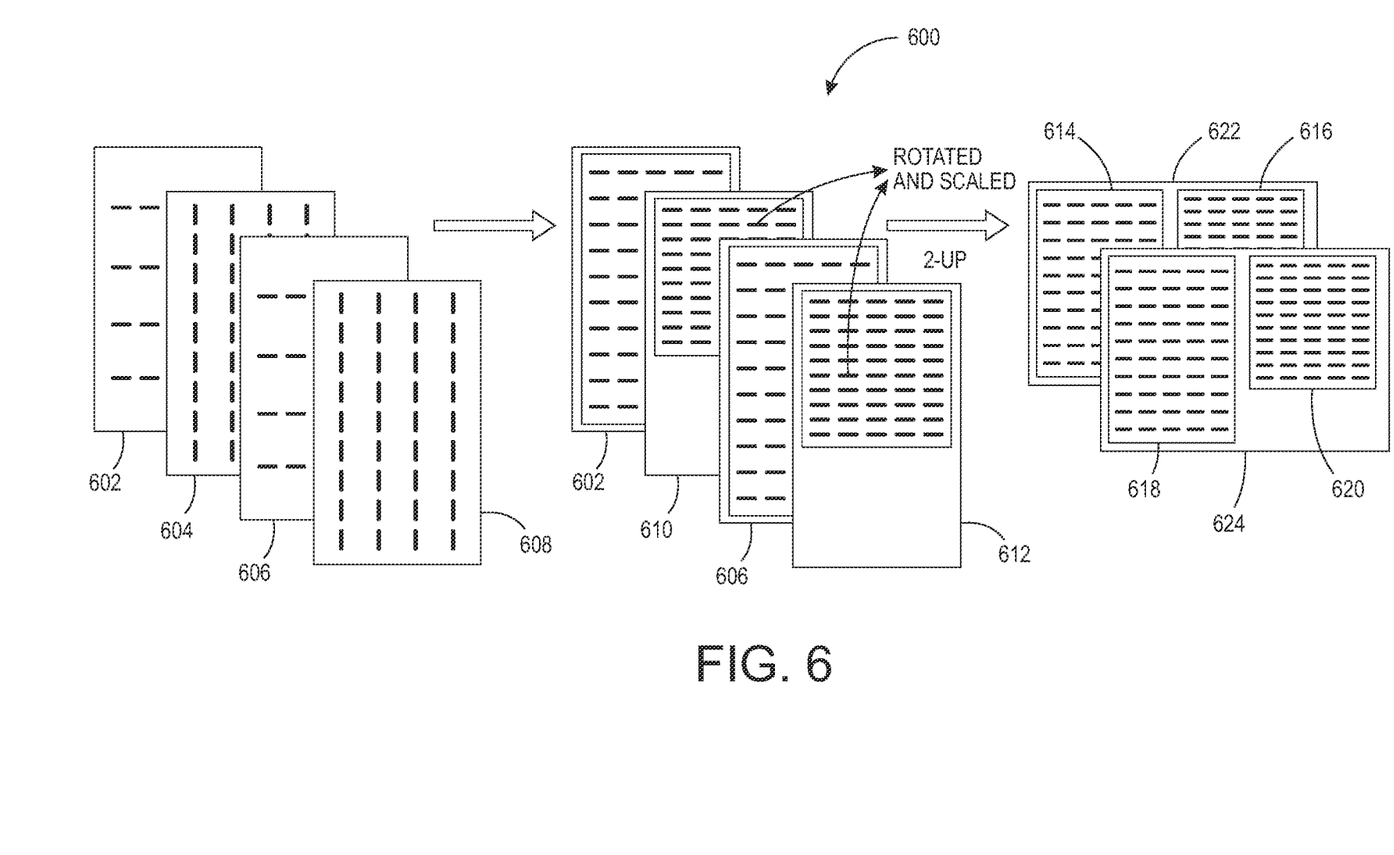
FIG. 6 is a schematic illustrating an operation of a method, according to an exemplary embodiment of present disclosure.

FIG. 6 is a schematic 600 illustrating an exemplary embodiment of present disclosure. First, the scanning module 202 scans four pages 602-608. Then, the user 102 uses a user selection module 204 to select the output orientation as landscape and 'N' as two. Since N>1, the system 200 uses the method 500 to process the pages. Next, the detection module 206 detects that the input orientation of the pages 602 and 606 as portrait, and the input orientation of the pages 604 and 608 as landscape. Since 'N' is not a square number and the output orientation selected by user is landscape, the orientation module 208 checks to determine whether the input orientation of the pages 602-608 is portrait. Since the input orientation of the pages 602 and 606 is portrait, no rotation and downscaling is required, so the orientation module 208 sends the pages 602 and 606 to the preparation module 210. However, the input orientation of the pages 604 and 608 is landscape. Accordingly, the orientation module 208 rotates pages 604 and 608. Then, the orientation module 208 detects the width of the page content on the pages 604 and 608 after rotation. If the page content does not fit on the portrait orientation of any page, the orientation module 208 adaptively downscales the page content based on detected page width so that it fits the width of page in portrait orientation. At this stage, the pages 610 and 612 are obtained. Then the preparation module 210 resizes the pages 602, 610, 606 and 612 based on the 4-Up selection of the user to obtain pages 614-620. Finally, the preparation module 210 arranges the pages 614-620 in landscape orientation on pages 822 and 824.

Figure 7:
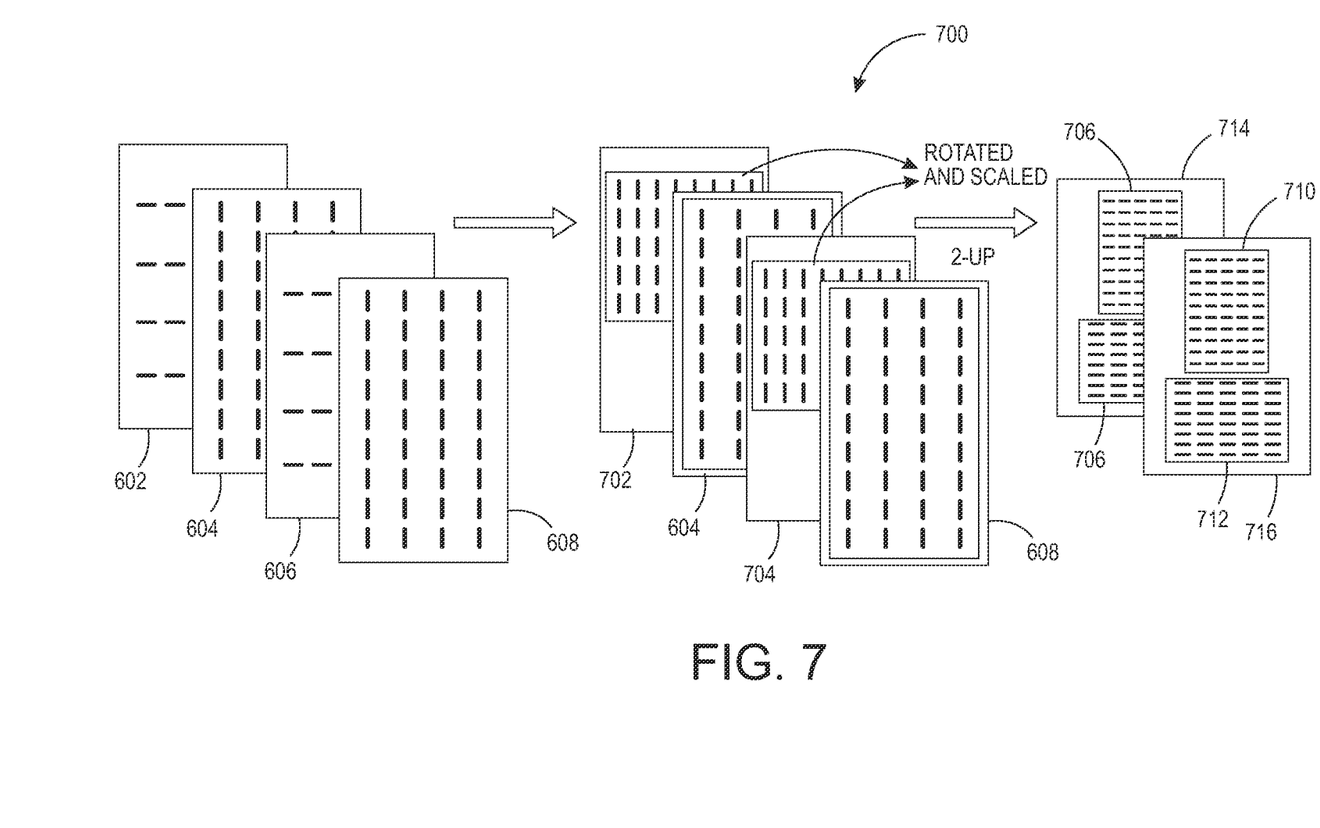
FIG. 7 is a schematic illustrating an operation of a method, according to an exemplary embodiment of present disclosure.

FIG. 7 is a schematic 700 illustrating an exemplary embodiment of present disclosure. First, the scanning module 202 scans four pages 602-608. Then, the user 102 uses a user selection module 204 to select the output orientation as portrait and 'N' as two. Since N>1, the system 200 uses the method 500 to process the pages. Next, the detection module 206 detects the input orientation of the pages 602 and 606 as portrait, and the input orientation of the pages 604 and 608 as landscape.

Since, 'N' is not a square number and the output orientation is portrait, the orientation module 208 checks to determine whether the input orientation of the pages 602-608 is landscape. Since the input orientation of the pages 604 and 608 is landscape, no rotation and downscaling is required, so the orientation module 208 sends the pages 604 and 608 to the preparation module 210. However, the orientation module 208 determines that the input orientation of the pages 602 and 606 is portrait. Accordingly, the orientation module 208 rotates pages 602 and 606. Then, the orientation module 208 detects the width of the page content on each page 602 and 606 after rotation. If the page content does not fit on the landscape orientation of any page, the orientation module 208 adaptively downscales the page content based on detected page width so that it fits the width of page in landscape orientation. At this stage, the pages 702 and 704 are obtained. Then the preparation module 210 resizes the pages 702, 604, 704 and 608 based on 4-Up selection of the user 102 to obtain pages 706-712. Finally, the preparation module 210 arranges the pages 706-712 in portrait orientation on pages 714 and 716.

Figure 8:
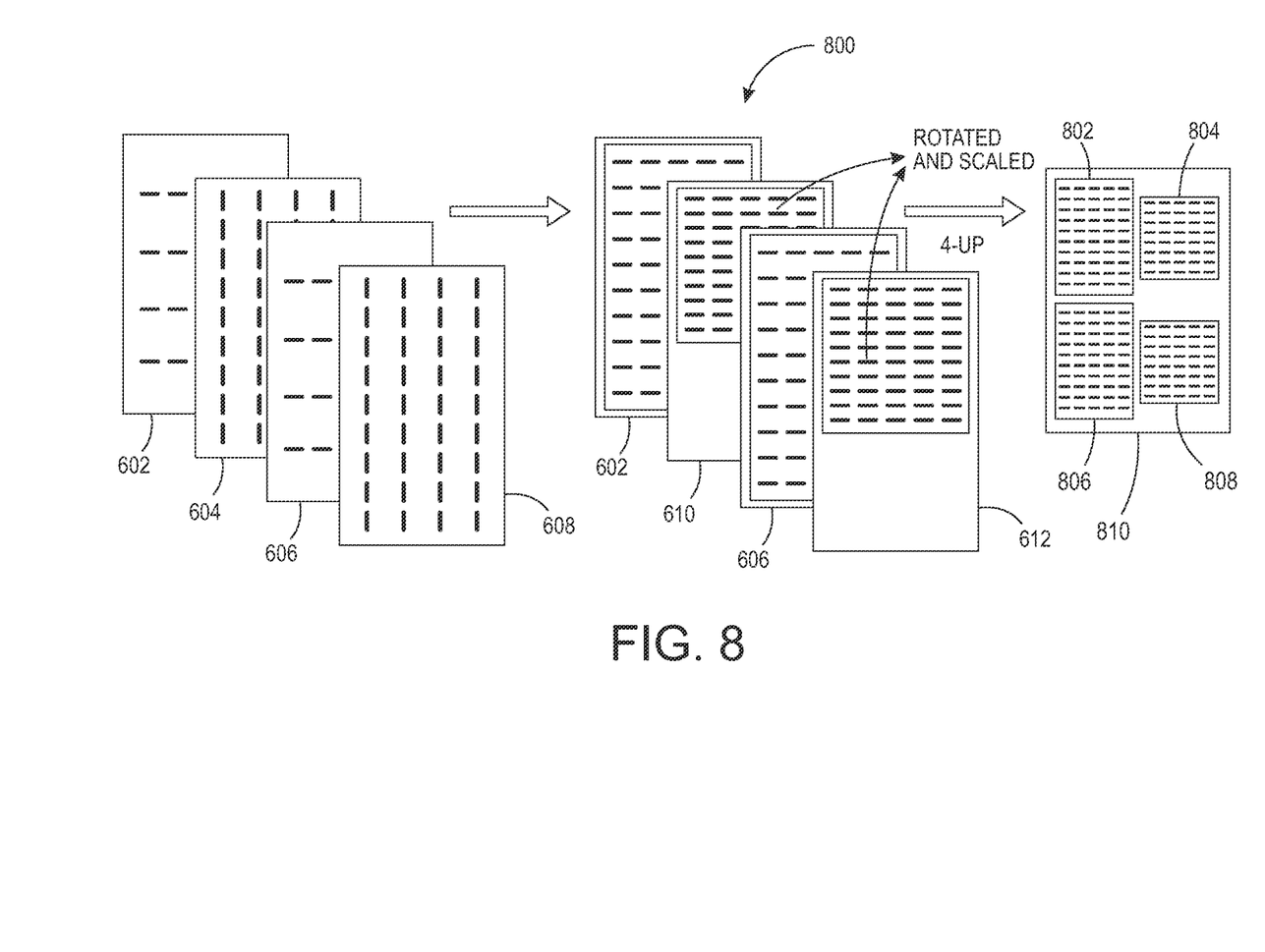
FIG. 8 is a schematic illustrating an operation of a method, according to an exemplary embodiment of present disclosure.

FIG. 8 is a schematic 800 illustrating an exemplary embodiment of present disclosure. First, the scanning module 202 scans four pages 602-608. Then, the user 102 uses the user selection module 204 to select the output orientation as portrait and 'N' as four. Since N>1, the system 200 uses the method 500 to process the pages. Then, the detection module 206 detects that the input orientation of the pages 602 and 606 as portrait, and the input orientation of the pages 604 and 608 as landscape.

Since, the value of 'N' chosen by 4 and the output orientation selected by user is portrait, the orientation module 208 checks to determine whether the input orientation of the pages 602-608 is portrait. Since the input orientation of the pages 602 and 606 is portrait, no rotation and downscaling is required, so the orientation module 208 sends the pages 602 and 606 to the preparation module 210. However, the input orientation of the pages 604 and 608 is landscape. Accordingly, the orientation module 208 rotates pages 604 and 608. Then, the orientation module 208 detects the width of the page content on the pages 604 and 608 after rotation. If the page content does not fit on the portrait orientation of any page, the orientation module 208 adaptively downscales the page content based on detected page width so that it fits the width of page in portrait orientation. At this stage, the pages 610 and 612 are obtained. Then, the preparation module 210 resizes the pages 602, 610, 606 and 612 based on the 4-Up selection of the user 102 to obtain pages 802-808. Finally, the preparation module 210 arranges the pages 802-808 in portrait orientation on page 810.

Figure 9:
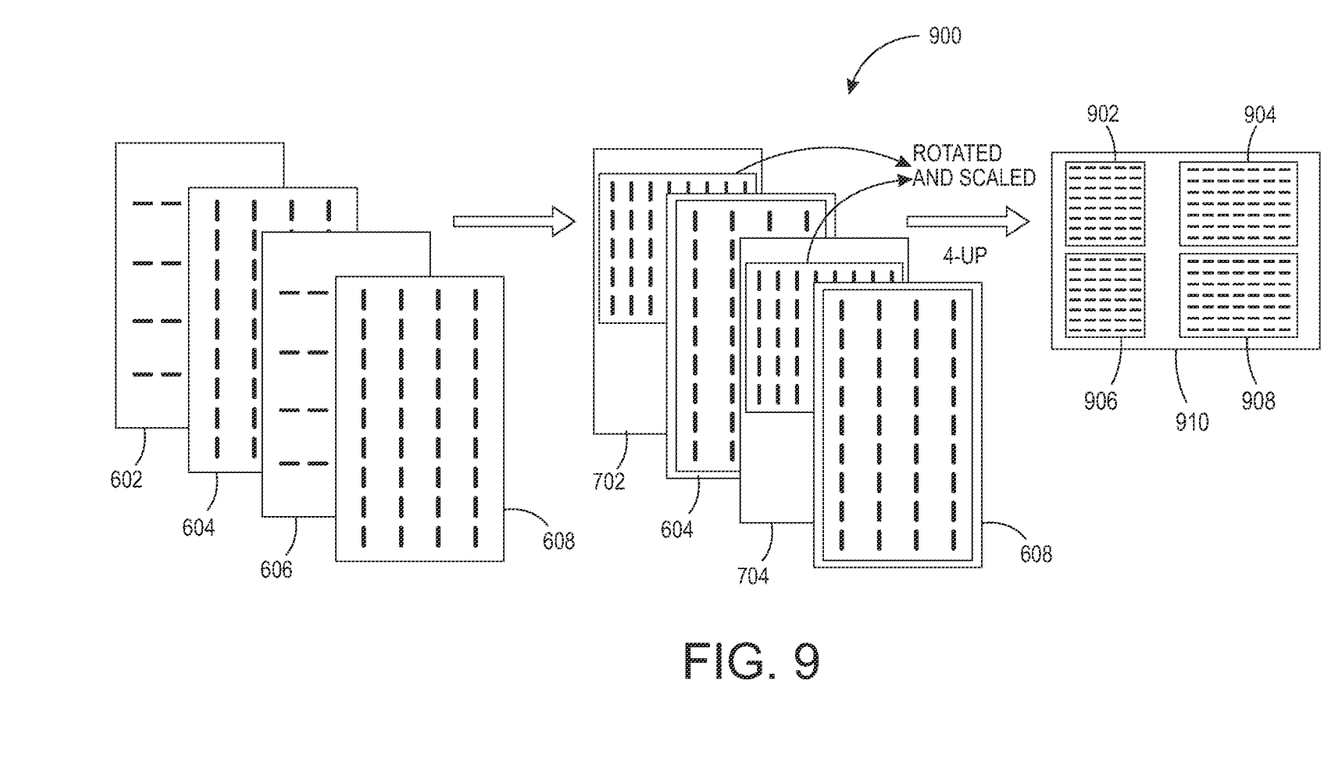
FIG. 9 is a schematic illustrating an operation of a method, according to an exemplary embodiment of present disclosure.

FIG. 9 is a schematic 900 illustrating an exemplary embodiment of present disclosure. The scanning module 202 scans four pages 602-608. Then, the user 102 uses user selection module 204 to select the output orientation as landscape and 'N' as four. Since N>1, the system 200 uses the method 500 to process the pages. Next, the detection module 206 detects that the input orientation of the pages 602 and 606 as portrait, and the input orientation of the pages 604 and 608 as landscape.

Since, the value of 'N' chosen by 4 and the output orientation selected by user is landscape, the orientation module 208 checks to determine whether the input orientation of the pages 602-608 is landscape. Since the input orientation of the pages 604 and 608 is landscape, no rotation and downscaling is required, so the orientation module 208 sends the pages 604 and 608 to the preparation module 210. However, the orientation module 208 determines that the input orientation of the pages 602 and 606 as portrait. Accordingly, the orientation module 208 rotates the pages 602 and 606. Then, the orientation module 208 detects the width of the page content on each page 602 and 606 after rotation. If the page content does not fit on the landscape orientation of any page, the orientation module 208 adaptively downscales the page content based on detected page width such that it fits the width of page in landscape orientation. At this stage, the pages 702 and 704 are obtained. Then the preparation module 210 resizes the pages 702, 604, 704 and 608 based on 4-Up selection of the user 102 to obtain pages 902-908. Finally, the preparation module 210 arranges the pages 902-908 in landscape orientation on a page 910.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of automatically modifying a scanned image of a page from an input document that includes a plurality of pages that include a plurality of images in different orientations, the method comprising:
   obtaining scanned images of the plurality of images in different orientations of the plurality of pages;
   receiving a user selection for an output page orientation of an output document;
   automatically detecting an input orientation of each scanned image;
   automatically rotating the scanned images from the detected input orientation of each of the scanned images to match the user selection for the output page orientation of the output document;
   automatically resizing each rotated scanned image content so that the content from each of the scanned images fits on a plurality of pages of the output document in the output document orientation; and
   preparing the output document so that the plurality of pages are provided in the output orientation.

2. The method of claim 1, wherein the obtaining scanned images includes at least one of receiving the scanned images of the plurality of pages from a scanner, receiving the scanned images of the plurality of pages stored in a memory and creating the scanned images from one or more electronic documents provided by a user.

3. The method of claim 1, wherein the detecting input orientation includes using projection profiles to ascertain the input orientation.

4. The method of claim 1, wherein the rotating the scanned images further includes turning each scanned image when the input orientation of one of the scanned images does not match the output page orientation of the output document.

5. The method of claim 1, wherein the rotating the scanned image includes turning the scanned image by one of 90 degrees or 270 degrees.

6. The method of claim 1, wherein the resizing further includes:
   automatically detecting a width of the rotated scanned image content; and
   automatically downscaling each scanned image content adaptively until the content fits within a printable area of pages of the output document in the output document orientation based on the detected width, wherein the printable area is the area of the page excluding margins of the page.

7. The method of claim 1, wherein the resizing further includes automatically downscaling each rotated scanned image content based on a fixed ratio until the rotated scanned image content fits within a printable area of pages of the output document in the output document orientation, wherein the printable area is the area of the page excluding margins of the page.

8. The method of claim 1, wherein the preparing the output document further includes receiving the scanned image of the page, when the input orientation of the scanned image matches the output document orientation.

9. The method of claim 1, wherein the preparing the output document further includes performing at least one of stapling, hole punching, folding, annotating and including one or more of page numbers, dates and watermarks.

10. The method of claim 1, further comprising accepting a user selection for printing N pages of the input document on a single page in the output document.

11. The method of claim 1, wherein performing the rotating the scanned image, when at least one of following conditions is met:
   the output orientation is landscape, the input orientation of the scanned image is portrait and N is a square number;
   the output orientation is portrait, the input orientation of the scanned image is landscape and N is a square number;
   the output orientation is landscape, the input orientation of the scanned image is landscape and N is not a square number; and
   the output orientation is portrait, the input orientation of the scanned image is portrait and N is not a square number.

12. The method of claim 11, wherein the preparing the output document includes further automatically resizing the plurality of pages such that N pages are printed on a single page in the output document.

13. A system of automatically modifying a scanned image of a page from an input document that includes a plurality of pages that include a plurality of images in different orientations, the system comprising a processor configured to:
obtain scanned images of the plurality of images in different orientations of the plurality of pages;
receive a user selection for an output orientation of an output document;
automatically detect an input orientation of each scanned image;
automatically rotate the scanned images from the detected input orientation of each of the scanned images to match the user selection for the output page orientation of the output document;
automatically resize each rotated scanned image content so that the content from each of the scanned images fits on a plurality of pages of the output document in the output document orientation; and
prepare the output document comprising the plurality of pages in the output orientation.

14. The system of claim 13, wherein the processor is configured to obtain scanned images includes performing at least one of receiving the scanned images of the plurality of pages from a scanner, receiving the scanned images of the plurality of pages stored in a memory and creating the scanned images from one or more electronic documents provided by a user.

15. The system of claim 13, wherein the processor is configured to detect the input orientation by using projection profiles to ascertain the input orientation.

16. The system of claim 13, wherein the processor is configured to rotate each of the scanned images when the input orientation of each of the scanned images does not match the output document orientation.

17. The system of claim 13, wherein the processor is configured to rotate the scanned image by one of 90 degrees or 270 degrees.

18. The system of claim 13, wherein the processor is configured to resize the rotated scanned image content by:
automatically detecting a width of the rotated scanned image content; and
automatically downscaling each scanned image content adaptively until the content fits within a printable area of pages of the output document in the output document orientation based on the detected width, wherein the printable area is the area of the page excluding margins of the page.

19. The system of claim 13, wherein the processor is configured to resize the rotated scanned image by automatically downscaling each rotated scanned image content based on a fixed ratio until the rotated scanned image content fits within a printable area of pages of the output document in the output document orientation, wherein the printable area is the area of the page excluding margins of the page.

20. The system of claim 13, wherein the processor is configured to prepare the output document by receiving the scanned image of the page, when the input orientation of the scanned image matches the output orientation.

21. The system of claim 13, wherein the processor is further configured to prepare the output document by performing at least one of stapling, hole punching, folding, annotating and including one or more of page numbers, dates and watermarks.

22. The system of claim 13, wherein the processor is further configured to accept a user selection for printing N pages of the input document on a single page in the output document.

23. The system of claim 22, wherein the processor is further configured to rotate the scanned image, when at least one of following conditions is met:
the output orientation is landscape, the input orientation of the scanned image is portrait and N is a square number;
the output orientation is portrait, the input orientation of the scanned image is landscape and N is a square number;
the output orientation is landscape, the input orientation of the scanned image is landscape and N is not a square number; and
the output orientation is portrait, the input orientation of the scanned image is portrait and N is not a square number.

24. The system of claim 23, wherein the processor is further configured to prepare the output document by further automatically resizing the plurality of pages such that N pages are printed on a single page in the output document.

25. A system of automatically modifying a scanned image of a page from an input document that includes a plurality of pages that include a plurality of images in different orientations, the system comprising:
a scanning module configured to obtain scanned images of the plurality of images in different orientations of the plurality of pages;
a user selecting module configured to receive a user selection for an output orientation of an output document;
a detecting module configured to automatically detect an input orientation of each scanned image;
an orienting module configured to:
automatically rotate the scanned images from the detected input orientation of each of the scanned images to match the user selection for the output page orientation of the output document; and
automatically resize each rotated scanned image content such that the content from each of the scanned images fits on a plurality of pages of the output document in the output document orientation; and
a preparing module configured to prepare the output document so that the plurality of pages are provided in the output orientation.

26. The system of claim 25, wherein the scanning module is configured to obtain scanned images includes performing at least one of receiving the scanned images of the plurality of pages from a scanner, receiving the scanned images of the plurality of pages stored in a memory and creating the scanned images from one or more electronic documents provided by a user.

27. The system of claim 25, wherein the detecting module is configured to detect the input orientation by using projection profiles to ascertain the input orientation.

28. The system of claim 25, wherein the orienting module is configured to rotate each of the scanned images when the input orientation of each of the scanned images does not match the output document orientation.

29. The system of claim 25, wherein the orienting module is configured to rotate the scanned image by one of 90 degrees or 270 degrees.

30. The system of claim 25, wherein the orienting module is configured to resize the rotated scanned image content by:
automatically detecting a width of the rotated scanned image content; and
automatically downscaling each scanned image content adaptively until it fits within a printable area of pages of the output document in the output document orientation based on the detected width, wherein the printable area is the area of the page excluding margins of the page.

31. The system of claim 25, wherein the orienting module is configured to resize the rotated scanned image by automatically downscaling each rotated scanned image content based on a fixed ratio until the rotated scanned image content fits within a printable area of pages of the output document in the output document orientation, wherein the printable area is the area of the page excluding margins of the page.

32. The system of claim 25, wherein the preparing module is configured to prepare the output document by receiving the scanned image of the page, when the input orientation of the scanned image matches the output document orientation.

33. The system of claim 25, wherein the preparing module is further configured to perform at least one of stapling, hole punching, folding, annotating and including one or more of page numbers, dates and watermarks.

34. The system of claim 25, wherein the user selecting module further is configured to accept a user selection for printing N pages of the input document on a single page in the output document.

35. The system of claim 34, wherein the orienting module is further configured to rotate the scanned image, when at least one of following conditions is met:
   the output orientation is landscape, the input orientation of the scanned image is portrait and N is a square number;
   the output orientation is portrait, the input orientation of the scanned image is landscape and N is a square number;
   the output orientation is landscape, the input orientation of the scanned image is landscape and N is not a square number; and
   the output orientation is portrait, the input orientation of the scanned image is portrait and N is not a square number.

36. The system of claim 35, wherein the preparing module is further configured to prepare the output document by further automatically resizing the plurality of pages such that N pages are printed on a single page in the output document.

37. A system of automatically modifying a scanned image of a page from an input document that includes a plurality of pages that include a plurality of images in different orientations, the system comprising a printer driver configured to:
   obtain scanned images of the plurality of images in different orientations of the plurality of pages;
   receive a user selection for an output orientation of an output document;
   automatically detect an input orientation of each scanned image;
   automatically rotate the scanned images from the detected input orientation of each of the scanned images to match the user selection for the output page orientation of the output document;
   automatically resize each rotated scanned image content so that the content from each of the scanned images fits on a plurality of pages of the output document in the output document orientation; and
   prepare the output document comprising the plurality of pages in the output orientation.

38. A method of automatically modifying a scanned image of a page from an input document that includes a plurality of pages that include a plurality of images in different orientations, the method comprising:
   obtaining scanned images of the plurality of images in different orientations of the plurality of pages;
   receiving a user selection for an output orientation of an output document;
   automatically detecting an input orientation of each scanned image;
   automatically rotating the scanned images by at least one of 90 degrees and 270 degrees, when the input orientation of the scanned images does not match the user selection for the output document orientation;
   automatically detecting a width of each rotated scanned image content;
   automatically downscaling each scanned image content adaptively until the content from each of the scanned images fits within a printable area of pages of the output document in the output document orientation based on the detected width, wherein the printable area is the area of the page excluding margins of the page; and
   preparing the output document comprising the plurality of pages in the output orientation.

39. A method of automatically modifying a scanned image of a page from an input document that includes a plurality of pages that include a plurality of images in different orientations, the method comprising:
   obtaining scanned images of the plurality of images in different orientations of the plurality of pages;
   receiving a user selection for an output orientation of an output document and for printing N pages of the input document on a single page in the output document;
   automatically detecting an input orientation of each scanned image;
   automatically rotating the scanned images, when at least one of following conditions is met:
   the output orientation is landscape, the input orientation of the scanned image is portrait and N is a square number;
   the output orientation is portrait, the input orientation of the scanned image is landscape and N is a square number;
   the output orientation is landscape, the input orientation of the scanned image is landscape and N is not a square number; and
   the output orientation is portrait, the input orientation of the scanned image is portrait and N is not a square number;
   automatically resizing each rotated scanned image content such that the scanned image content fits on a plurality of pages of the output document in the output document orientation; and
   preparing the output document comprising further resizing the plurality of pages such that N pages are printed on a single page in the output document, wherein all pages in the output document are printed in the output orientation.

40. A non-transitory computer readable carrier comprising processing instructions adapted to cause a processor to execute the method of claim 1.

41. A non-transitory computer readable carrier comprising processing instructions adapted to cause a processor to execute the method of claim 38.

42. A non-transitory computer readable carrier comprising processing instructions adapted to cause a processor to execute the method of claim 39.

* * * * *